(12) United States Patent
McCoy et al.

(10) Patent No.: US 6,682,089 B2
(45) Date of Patent: Jan. 27, 2004

(54) ADJUSTABLE FIFTH WHEEL HITCH WITH IMPROVED LOCKING MECHANISM

(75) Inventors: Richard W. McCoy, Granger, IN (US); Thomas W. Lindenman, South Bend, IN (US)

(73) Assignee: Cequent Towing Products, Inc., Plymouth, MI (US)

( * ) Notice: Subject to any disclaimer, the term of this patent is extended or adjusted under 35 U.S.C. 154(b) by 95 days.

(21) Appl. No.: 10/085,958

(22) Filed: Feb. 28, 2002

(65) Prior Publication Data

US 2003/0160429 A1 Aug. 28, 2003

(51) Int. Cl.$^7$ ............................................. B62D 53/06
(52) U.S. Cl. ................................... 280/438.1; 280/407
(58) Field of Search ............................. 280/407, 438.1, 280/407.1, 433, 435, 441.1, 439, 411

(56) References Cited

U.S. PATENT DOCUMENTS

| | | |
|---|---|---|
| 2,680,627 A | 6/1954 | Johnson et al. |
| 2,799,516 A | 7/1957 | Greenway |
| 2,819,096 A | 1/1958 | Sencenich |
| 2,860,891 A | 11/1958 | Ramun |
| 2,900,194 A | 8/1959 | Lay |
| 2,985,463 A | 5/1961 | Geerds |
| 3,112,936 A | 12/1963 | Cole et al. |
| 3,170,716 A | 2/1965 | Walther et al. |
| 3,402,944 A | 9/1968 | Day |
| 3,584,899 A | 6/1971 | Gottler |
| 3,606,384 A | 9/1971 | Fontaine et al. |
| 3,746,369 A | 7/1973 | Neff et al. |
| 3,861,709 A | 1/1975 | Mulcahy et al. |
| 3,893,710 A | 7/1975 | Madura |
| 4,134,601 A | 1/1979 | Propst |
| 4,429,892 A | 2/1984 | Frampton et al. |
| 4,505,344 A | 3/1985 | Hobbs et al. |
| 4,614,355 A | 9/1986 | Koch |
| 5,707,070 A | 1/1998 | Lindenman et al. |
| 6,247,720 B1 | 6/2001 | Linger et al. |

*Primary Examiner*—Avraham Lerner
(74) *Attorney, Agent, or Firm*—King & Schickli, PLLC

(57) ABSTRACT

An adjustable fifth wheel hitch includes a support frame having base rails that are secured to the frame of a vehicle and a pair of spaced guide rails that bridge between the base rails. The fifth wheel hitch also includes a head assembly having a jaw assembly for engaging a king pin on a trailer. The head assembly also includes low friction shoes, rollers or the like for mounting the head assembly on the spaced guide rails so that the head assembly is selectively displaceable between a towing position and a maneuvering position. A lock on the head assembly includes at least one bar latch, a biasing element and a cam for engaging the biasing element. The bar latch is received in the first aperture in the guide rail to releaseably lock the head assembly in the towing position and in the second aperture of the guide rail to releaseably lock the head assembly in the maneuvering position.

14 Claims, 6 Drawing Sheets

ADJUSTABLE FIFTH WHEEL HITCH WITH IMPROVED LOCKING MECHANISM

TECHNICAL FIELD

The present invention relates generally to the trailer towing field, and more particularly, to an improved fifth wheel hitch with an improved locking mechanism that is adjustable to conveniently allow enhanced maneuverability in limited or tight operating areas when required.

BACKGROUND OF THE INVENTION

Fifth wheel hitches for towing a trailer behind a vehicle have long been known in the art. Examples of state of the art fifth wheel hitches include those presently manufactured by Reese Products, Inc. of Elkhart, Ind. under U.S. Pat. No. 5,707,070 and U.S. patent application Ser. No. 60/313,299 filed Aug. 17, 2001.

These state of the art fifth wheel hitches include a support frame having base rails that are secured to the frame or other structure of a towing vehicle and a pair of spaced guide rails that bridge between the base rails. These fifth wheel hitches also include a head assembly having a jaw assembly for engaging a king pin of a trailer. A head support and a pair of uprights mount the head assembly for relative fore-and-aft sliding movement along the guide rails between a towing position and a maneuvering position. In one embodiment load bearing shoes formed from nylon, polytetrafluoroethylene or other known low friction material are provided in each upright to slide over the surface of the guide rails and allow smooth movement of the head assembly. In another embodiment, a roller arrangement is provided in each upright to roll on the surfaces of the guide rails and allow smooth movement of the head assembly between towing and maneuvering positions. In either of these embodiments, a releasable locking mechanism secures the head assembly in either of the selected positions.

While such state of the art fifth wheel hitches provide excellent overall performance and dependable operation, it is believed that further design improvements are still possible. The present invention relates to an improvement in the locking mechanism that provides for smoother overall operation and enhanced customer satisfaction.

SUMMARY OF THE INVENTION

In accordance with the purposes of the present invention as described herein, an improved adjustable fifth wheel hitch is provided for towing a trailer behind a motor vehicle. The adjustable fifth wheel hitch includes a support frame having a pair of spaced guide rails. At least one of those guide rails has first and second apertures therein. The adjustable fifth wheel hitch also includes a head assembly having a jaw assembly for engaging a trailer and means for mounting the head assembly on the pair of spaced guide rails so that the head assembly is selectively displaceable between a towing position and a maneuvering position.

A lock is provided on the head assembly. The lock includes at least one bar latch, a biasing element and a cam engaging the biasing element. The bar latch is selectively received and held in the first aperture in the guide rail to releaseably lock the head assembly in the towing position and in the second aperture in the guide rail to releaseably lock the head assembly in the maneuvering position.

More specifically describing the invention, the means for mounting the head assembly on the pair of spaced guide rails may comprise, for example, low friction shoes, rollers or any other appropriate structures which allow for smooth sliding movement of the head assembly over the guide rails of the support frame. Still further describing the invention, the lock of the head assembly includes a first bar latch, a second bar latch, the biasing element, and the cam for engaging the biasing element. Each of the bar latches is substantially L-shaped in one possible embodiment. The biasing element may comprise a leaf spring and the cam may comprise a roller that engages and rolls over a surface of that leaf spring.

In accordance with still another aspect of the present invention, the first and second cooperating apertures in the guide rail may be offset from one another with respect to a longitudinal axis of the guide rail. Similarly, the first and second bar latches are offset in the same manner. Accordingly, the first bar latch only aligns with the first aperture and therefore can only be received in the first aperture, not the second aperture. Likewise, the second bar latch aligns only with the second aperture and, therefore, can only be received in the second aperture, not the first aperture.

Still other aspects and features of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as descriptive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
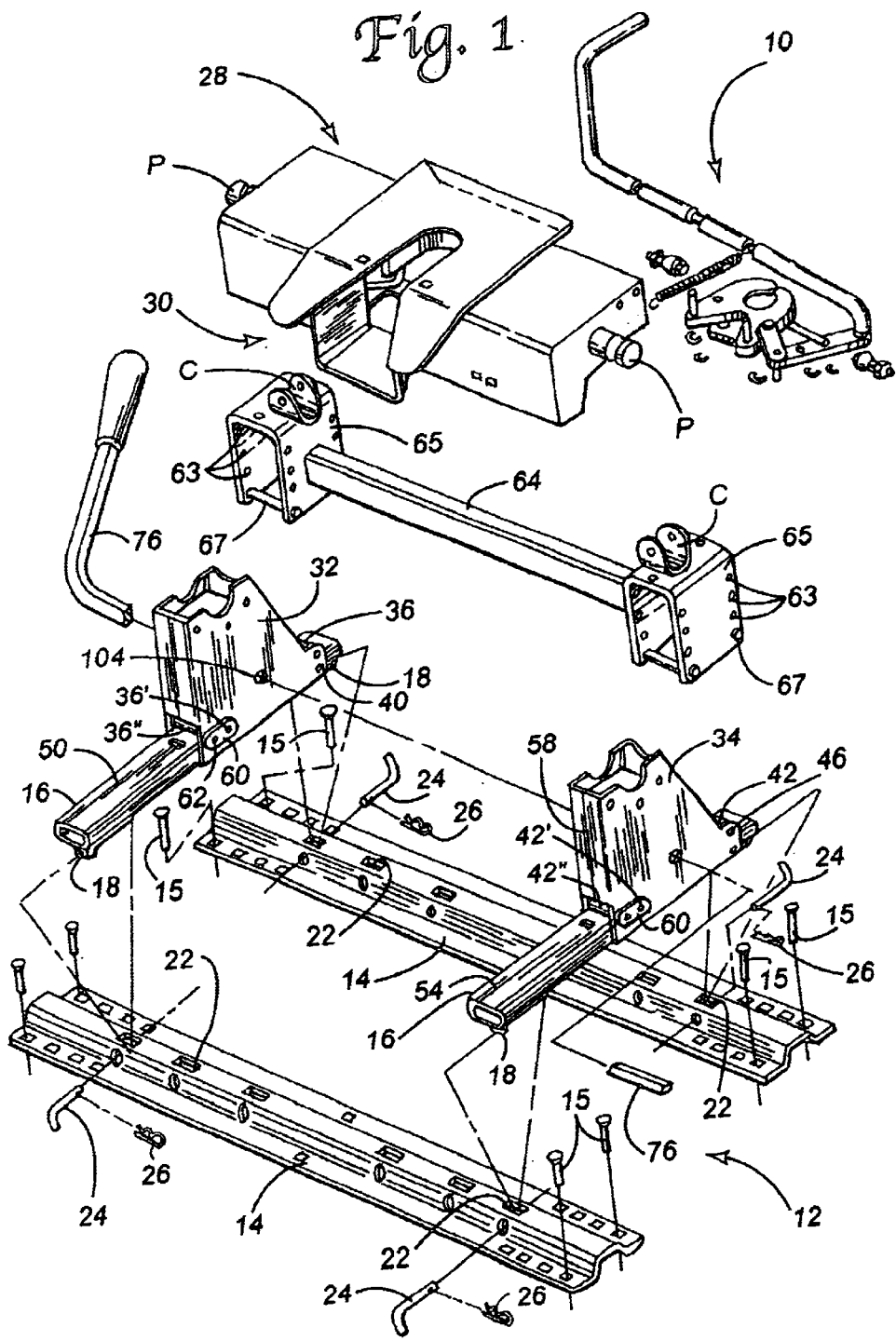
FIG. 1 is a partially exploded perspective view of the fifth wheel hitch of the present invention for towing a trailer behind a motor vehicle.

Reference is now made to FIG. 1 showing the fifth wheel hitch of the present invention. The hitch 10 includes a support frame, generally designated by reference numeral 12, comprising a pair of spaced parallel base rails of conventional design. These base rails 14 are bolted (note bolts 15) or otherwise fastened to the frame of the motor vehicle, such as a pickup truck, in a manner well known in the art. Additionally, the support frame 12 includes a pair of spaced guide rails 16 that are mounted so as to bridge between the transversely extending base rails 14 and thereby extend parallel to the longitudinal axis of the motor vehicle. More particularly, each guide rail 16 is formed from a four-sided tube constructed from steel or other appropriate high strength material. A downwardly depending mounting tab 18 may be welded, fixed with bolts or mounted in some other manner at each end of the guide rails 16. Each mounting tab 18 is adapted for receipt in a matching slot 22 formed in the base rails 14. A connecting pin 24 may be passed through aligned cooperating apertures in each of the base rails 14 and tabs 18. A pin clip or other means 26 may then be utilized to secure each connecting pin 24 and, therefore, the guide rails 16 in position.

As is known in the art, the fifth wheel hitch 10 also includes a head assembly generally designated by reference numeral 28. The head assembly 28 carries a jaw assembly, generally designated by reference numeral 30, for releaseably engaging the king pin of a trailer to be towed by the motor vehicle equipped with the hitch 10. Such jaw assemblies 30 are well known in the art. One such jaw assembly 30 that may be utilized is disclosed in U.S. Pat. No. 5,516,137 to Kass et al. also owned by the assignee of the present invention. The disclosure in that patent is fully incorporated herein by reference. It should be appreciated, however, that jaw assemblies of other design may also be incorporated into the present invention.

Figure 4:
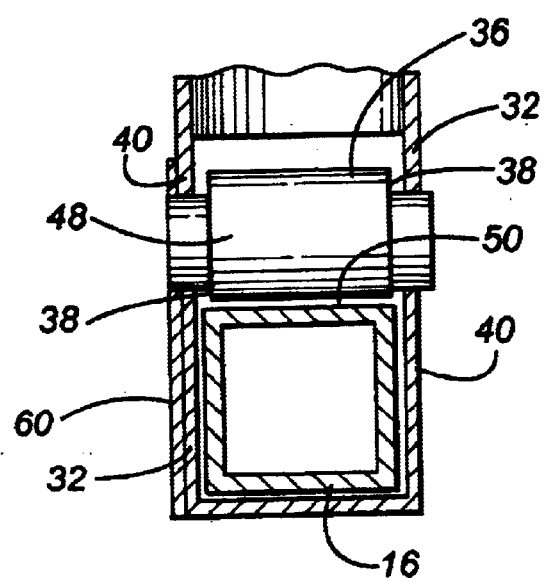
FIG. 4 is a detailed, partially sectional view showing the mounting of one roller in one upright.

The head assembly 28 also includes first and second side brackets or uprights 32, 34. One upright 32, 34 is mounted for sliding movement along each guide rail 16. As should be appreciated, the first upright 32 includes a first set of three rollers 36, 36', 36" (see also FIG. 4). Each of the rollers 36, 36', 36" is mounted for relative rotation in the first upright 32. More specifically, each of the substantially cylindrical rollers 36, 36', 36" includes a shoulder 38 adjacent each end thereof. The portion of each roller 36, 36', 36" projecting outwardly from beyond the shoulder 38 is captured in an aperture 40 in opposing side walls of the first upright 32 (see FIG. 4 illustration).

Similarly, a second set of three rollers 42, 42', 42" is held for relative rotation on the second upright 34. The rollers 42, 42', 42" also include a shoulder at each end. The portion of the rollers 42, 42', 42" projecting beyond the shoulder are captured in cooperating apertures 46 in opposing side walls of the second upright 34.

The faces 48 of the first set of rollers 36, 36', 36" engage, roll over and follow the upper wall 50 of a first of the guide rails 16, while the faces of the second rollers 42, 42', 42" engage, roll over and follow the upper wall 54 of a second of the base rails 16. Together, the rollers 36, 36', 36" and 42, 42', 42" allow smooth, selective displacement of the head assembly 28 between a forward or towing position for properly distributing the weight of the trailer for high speed over-the-road towing and a rearward or maneuvering position for providing added clearance between the body work of the motor vehicle and the trailer. This added clearance provides the necessary space to allow the operator to negotiate tight corners without the trailer interfering with and engaging the vehicle body work. Hence, greater maneuverability is provided for vehicle operation in confined areas such as are often encountered in parking lots, trailer parks, campgrounds and the like.

Figure 2:
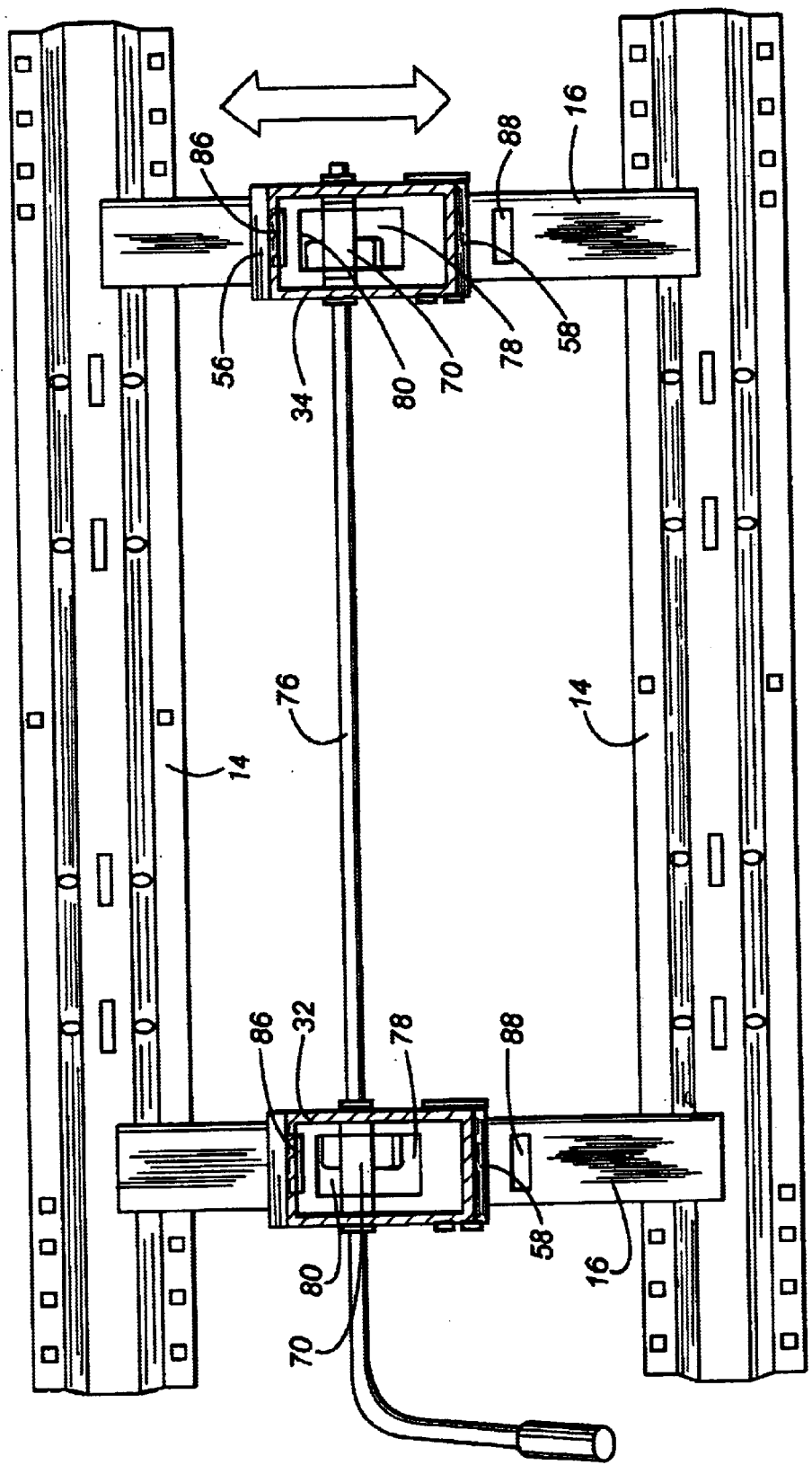
FIG. 2 is a top plan view of the hitch showing the offset of the latch bars and the cooperating apertures in the underlying spaced guide rails (the head support and leaf spring are removed for clarity)
Figure 3:
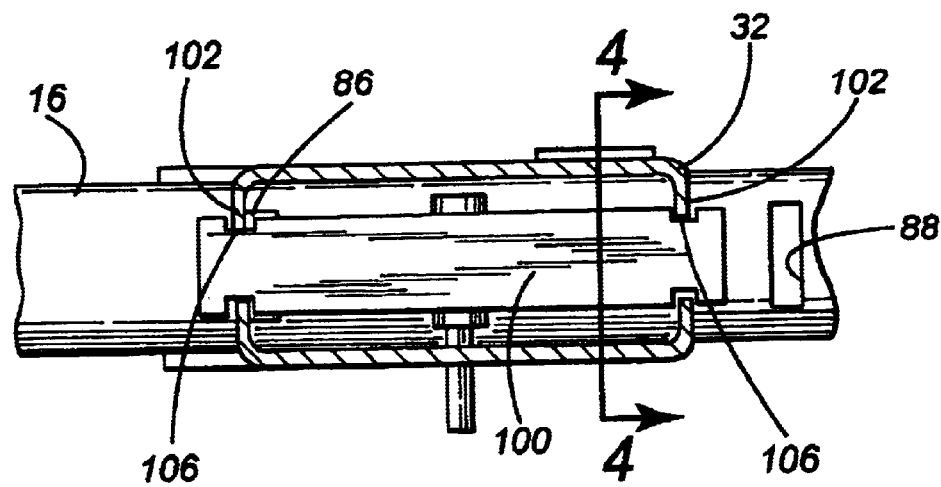
FIG. 3 is a partially sectional detailed view showing the mounting of the leaf spring in an upright.

As should be appreciated from reviewing drawing FIGS. 1–3, the first and second uprights 32, 34 each include a first end or rear wall 56 and an opposing second end or front wall 58. The first end 56 is angled from bottom to top toward the second end 58 thereby forming an obtuse angle A with the guide rail 16 upon which the upright 32, 34 rests. This angle is between 91–140° and more typically is about 122°. The second end 58 of each upright 32, 34 forms an angle B of between about 75–89° (typically about 80°) with the guide rail 16 upon which it rests. This angular orientation of the end walls 56, 58 creates an aesthetically pleasing and aerodynamic appearance when viewed from the side. The angular orientation of the first and second ends 56, 58 also results in a greater distribution of the trailer weight toward the second end 58. This is the reason that only one roller 36, 42 is provided in the respective uprights 32, 34 adjacent the first end wall 56 while two rollers 36', 36" and 42', 42" are provided in the respective first and second uprights adjacent the second end wall 58. A reinforcing plate 60 may be welded or otherwise secured to each of the opposed side walls of the first and second uprights 32, 34 to reinforce and strengthen the side walls in the area of the rollers 36', 36" and 42', 42". Each of the reinforcing plates 60 may also include an aperture 62 for receiving and holding the projecting mounting ends of the rollers 36', 36", 42', 42" if desired.

The head assembly 28 also includes a cross member or head support 64 of a type known in the art to bridge between and interconnect the uprights 32, 34. Preferably, the head support 64 includes a U-shaped mounting bracket 65 at each end. Each mounting bracket 65 includes a series of vertically spaced apertures 63 that receive mounting pins or bolts 67 that allow height adjustment to enhance the versatility of the hitch 10 in interconnecting motor vehicles and trailers of various height dimensions. As is further known in the art, the head assembly 28 is pivotally mounted to the head support 64 (note pivot pins P and cooperating cradles C). This pivotal connection may be accomplished by means well known in the art including but not limited to that disclosed in U.S. Pat. Nos. 5,509,682 to Lindenman et al. and 5,529,329 to McCoy, also both owned by the assignee of the present invention. The disclosure in both of these patents is fully incorporated herein by reference.

As should further be appreciated, the hitch 10 includes a lock, generally designated by reference numeral 66, for releaseably locking the head assembly 28 in the towing and maneuvering positions (see FIGS. 5 and 6a–6d respectively). More preferably, two locks 66 are provided, one mounted within an internal cavity formed in each upright 32, 34.

Each lock 66 includes a latching element 69 having a hub 70 having a square through-hole 74 for receiving a square cross-sectioned control handle 76. Additionally, each latching element 69 includes first and second outwardly projecting bar latches 78, 80. Preferably the bar latches 78, 80 are substantially L-shaped. Each of the bar latches 78, 80 includes a tip adapted for receipt in one of two cooperating locking apertures 86, 88 formed in the upper walls 50, 54 of the guide rails 16.

Figure 5:
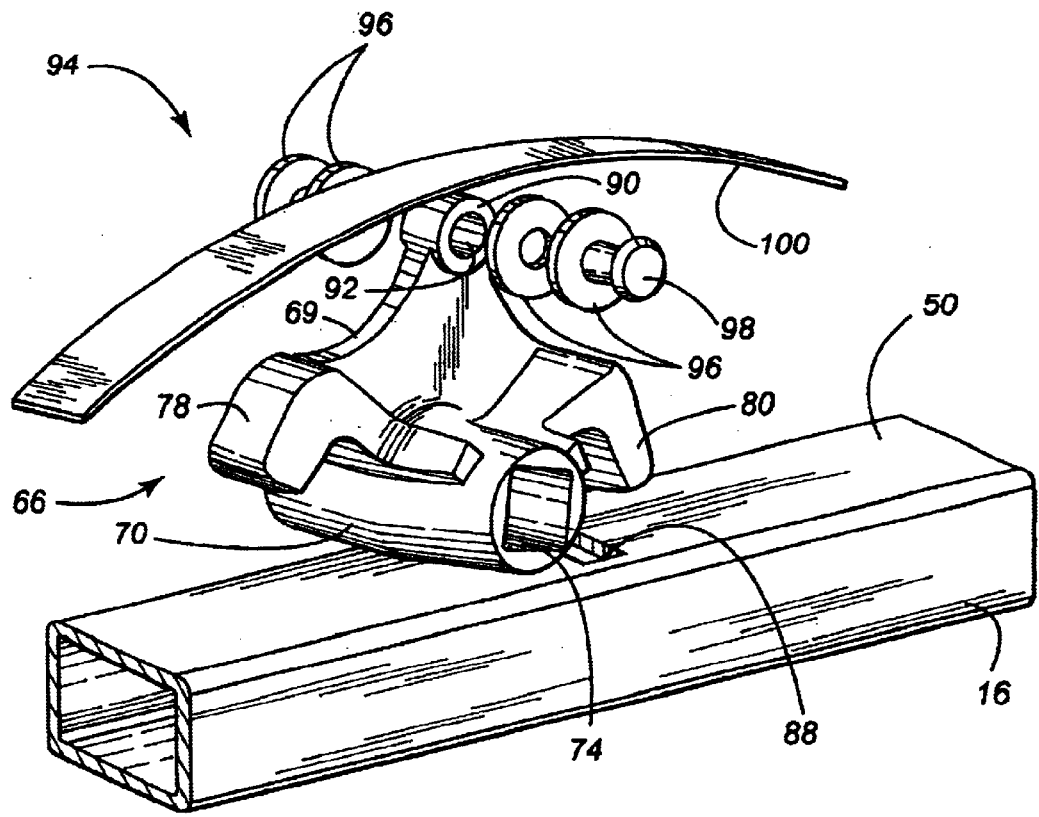
FIG. 5 is an exploded perspective view showing the improved lock of the hitch assembly of the present invention.

An intermediate lug 90 is provided between the bar latches 78, 80. As best shown in FIG. 5, the lug 90 includes an aperture 92. A roller, generally designated by reference number 94, is mounted to the latching element 69 in this aperture 92. As illustrated, the roller 94 is formed by four washers 96 that are connected by a fastener such as a rivet 98. The washers 94 are secured to the latching element 69 by means of the rivet 98 in the aperture 92 but remain free to rotate with respect to the latching element 69.

The lock 66 also includes a biasing means in the form of a leaf spring 100. As shown, one leaf spring 100 is secured in the cavity formed in each upright 32, 34. More specifically, it should be appreciated that the uprights 32, 34 are formed from two half sections. The front and rear walls of the two half sections include aligned, cooperating slots 102 that secure the notched distal ends of the leaf spring 100 so that the leaf spring is held in a position bridging across the cavity overlying each latching element 69 (see FIG. 3). Aligned cooperating apertures 104 in the side walls of the two half sections of the uprights 32, 34 are sized to receive the hub 70 so as to allow pivotal movement of the latching element 69 received therebetween.

During construction, one side of the hub 70 of the latching element 69 is positioned in the aperture 104 of one of the half sections of the uprights 32, 34. At the same time, a leaf spring 100 is positioned so that the distal ends thereof fit in the slots 102 in that same half section of the uprights 32, 34. The projecting, mounting ends of the rollers 36, 36', 36" or 42, 42', 42" are also positioned in the cooperating apertures 40 or 46 in that same half section. The other half section is then positioned against the first half section so that the opposite end of the hub 70 is received in the aperture 104 in that half section, the notched ends 106 of the leaf springs 100 are likewise received in the slots 102 of that half section and the projecting mounting ends of the rollers 36, 36', 36" or 42, 42', 42" are received in the cooperating apertures 40 or 46 of that half section. The two half sections of the upright 32 or 34 are then welded or otherwise secured together thereby capturing the leaf spring 100, latching element 69 and rollers 36, 36', 36" or 42, 42', 42" in position (see FIGS. 1 and 4).

Figure 6A:
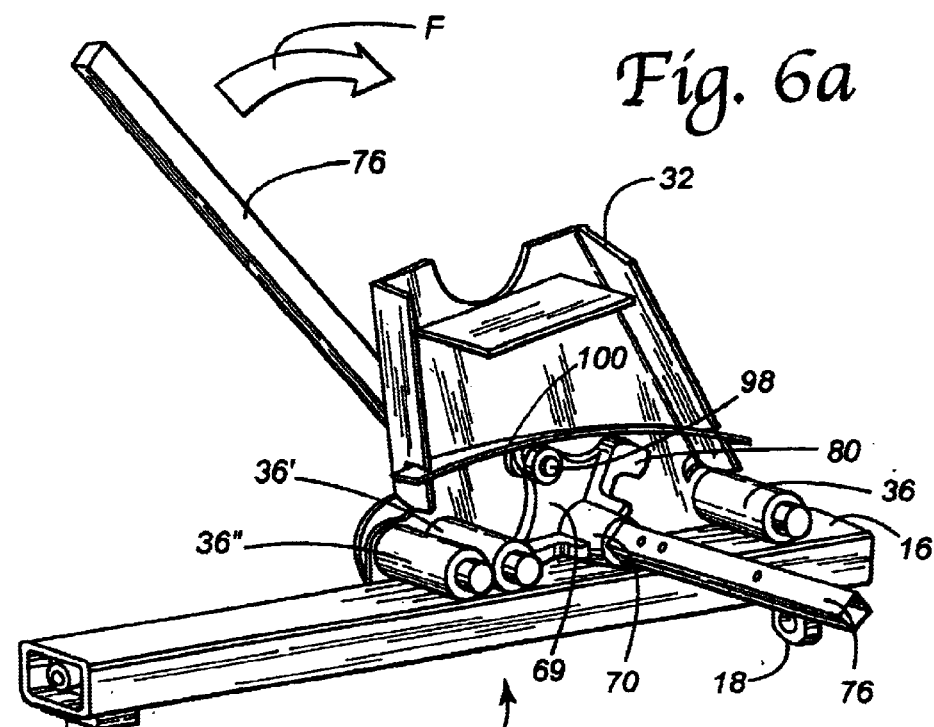
FIGS. 6a–6d are schematical perspective views showing the lock (a) securing the head assembly in the forward, towing position, (b) in an intermediate, rearward translating position, (c) securing the head assembly in the rearward, maneuvering position, and (d) in an intermediate, forward translating position.
Figure 6B:
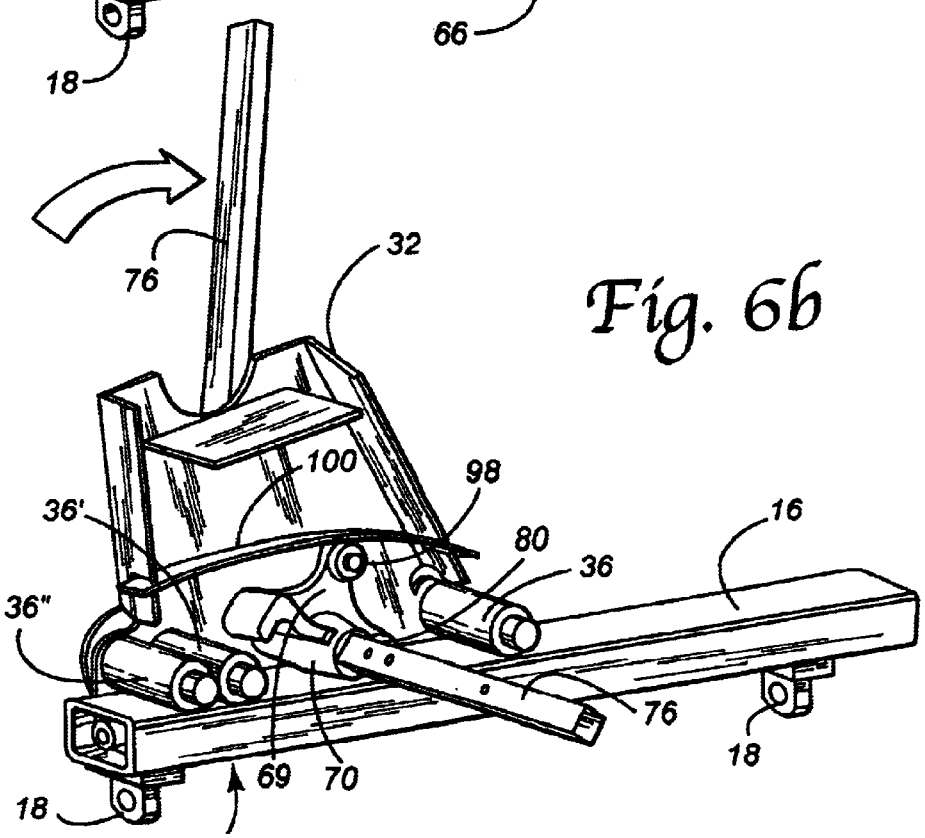
Figure 6C:
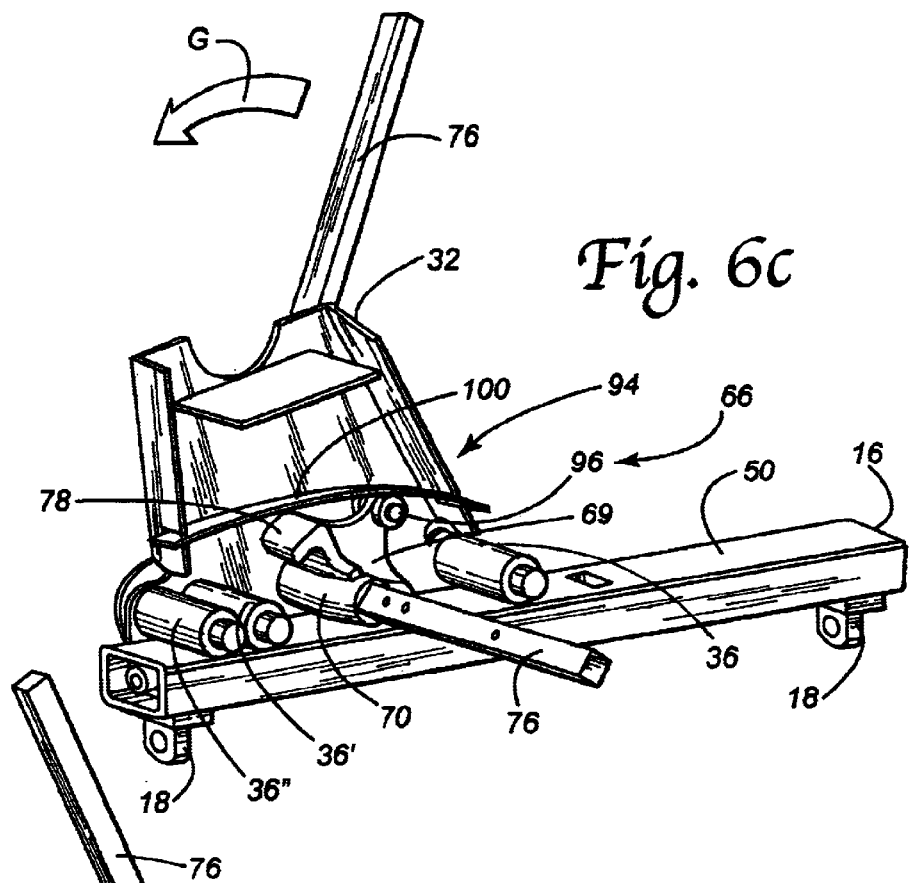
Figure 6D:
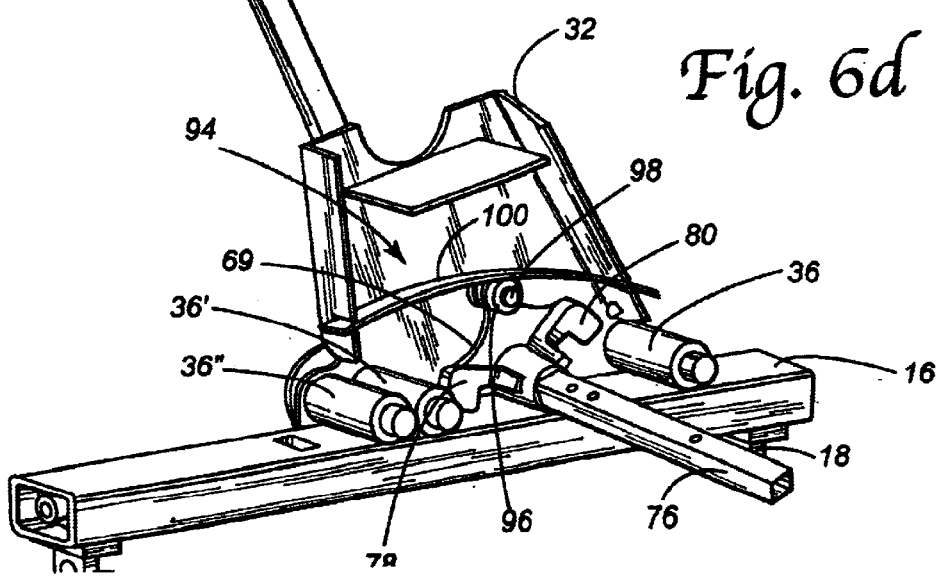

The operation of the hitch 10 and the new and improved lock mechanism will now be described in detail. As shown in FIG. 6a, the hitch 10 is in the towing position. More specifically, the head assembly 28 is positioned toward the front end of the hitch 10 where the weight of the trailer is better distributed over the vehicle axles for stable, over-the-road towing at road speeds. In this position, the uprights 32, 34 each engage a stop (not shown) that may be secured to or integrally formed on the guide rails 16. Additionally, the first or rearwardly projecting bar 78 of each latching element 69 is received in the first or forward locking aperture 86 in the adjacent guide rail 16. As should be appreciated, the roller 94 on the lug 90 engages the leaf spring 100 "over-center" so that the first bar 78 is biased into and held in engagement in the locking aperture 86. As a result, the head assembly 28 is reliably secured in the towing position.

Upon reaching the desired destination, low speed maneuverability may become a more desired operating characteristic than high speed towing stability. As pointed out above, in order to allow sharper cornering the clearance between the trailer and the body work of the motor vehicle must be increased. This may be done by means of a simple process. First the operator stops the motor vehicle. The operator then gets out and manipulates the control handle 76 so as to pivot the latching elements 69 in a clockwise direction as shown by action arrow F in FIG. 6a. As this is done, the roller 94 smoothly rides without binding over-center across the surface of the leaf spring 100 (see also FIG. 6b). As a result, the leaf spring 100 now biases the second or forwardly directed bar 80 downwardly toward the surface of the underlying guide rail 16.

The operator then gets back into the vehicle and pulls the vehicle forward while engaging the trailer brakes. As a result of this action, the head assembly 28 held on the uprights 32, 34 moves rearwardly to the maneuvering position shown in FIG. 6c. Smooth, non-binding movement is ensured by the two sets of rollers, 36, 36', 36" and 42, 42', 42". Further, it should be appreciated that each second bar 80 is prevented from engaging the first locking aperture 86. This is because the second bar 80 and the first aperture 86 are offset with respect to the longitudinal centerline underlying the guide rail 16 (note particularly FIG. 2). Thus, each first bar 78 will only align with and engage in the first cooperating aperture 86 whereas each second bar 80 will only align with and engage in the cooperating second aperture 88.

As the head assembly 28 moves rearwardly, the uprights 32, 34 engage the foot or base of the mounting tabs 18 and substantially simultaneously the tapered tip of each second bar 80 is biased down into the corresponding second locking aperture 88 by the force generated by the associated leaf spring 100. The trailer is then secured in the maneuvering position with a significant increase in clearance of, perhaps, nine inches between the trailer and the body work of the motor vehicle. This added space or clearance allows for sharp cutting so that the operator may negotiate in tight areas where maneuverability is required.

Of course, a similar, simple procedure may be utilized to return the head assembly 28 to the towing position. When the added clearance for utmost maneuverability is no longer required, the operator stops the motor vehicle, gets out and rotates the control handle 76 in a counterclockwise direction (see action arrow G in FIG. 6c). This pivots the latching elements 69 causing each forwardly projecting second bar 80 to pivot out of the cooperating second locking aperture 88. The rollers 94 track smoothly and easily over-center against the associated leaf springs 100 without binding so that the distal ends of each first bars 78 are biased downwardly and into engagement with the upper surface or wall 50, 54 of the underlying guide rails 16. The operator then gets back into the vehicle and backs the vehicle toward the trailer with the trailer brakes engaged. This causes the head assembly 28 held on the uprights 32, 34 to slide forward along the guide rails 16 on the smoothly turning first and second set of rollers 36, 36', 36" and 42, 42', 42". This forward sliding movement continues until the uprights 32, 34 engage the stops (not shown). Substantially simultaneously the leaf springs 100 bias the tapered tips of the first bars 78 back into the cooperating first locking apertures 86. Of course, the first bars 78 are prevented from hanging up in the second locking apertures 88 because of the offset arrangement. The engagement of the bars 78 in the apertures 86 functions to lock the head assembly 28 in the towing position.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An adjustable fifth wheel hitch, comprising:
   a support frame including a pair of spaced guide rails, at least one guide rail of said pair of spaced guide rails having first and second apertures therein;

a head assembly including a jaw assembly for engaging a trailer and means for mounting said head assembly on said pair of spaced guide rails so as to be selectively displaceable between a towing position and a maneuvering position; and a lock on said head assembly including at least one bar latch, a biasing element and a live cam engaging said biasing element, said at least one bar latch being received (a) in said first aperture in said one guide rail to releaseably lock said head assembly in said towing position, and (b) in said second aperture in said one guide rail to releaseably lock said head assembly in said maneuvering position.

2. An adjustable fifth wheel hitch, comprising:

a support frame including a pair of spaced guide rails, at least one guide rail of said pair of spaced guide rails having first and second apertures therein;

a head assembly including a jaw assembly for engaging a trailer and shoes/rollers for mounting said head assembly on said pair of spaced guide rails so as to be selectively displaceable between a towing position and a maneuvering position; and a lock on said head assembly including at least one bar latch, a biasing element and a live cam engaging said biasing element, said at least one bar latch being received (a) in said first aperture in said one guide rail to releaseably lock said head assembly in said towing position, and (b) in said second aperture in said one guide rail to releaseably lock said head assembly in said maneuvering position.

3. An adjustable fifth wheel hitch, comprising:

a support frame including a pair of spaced guide rails, at least one guide rail of said pair of spaced guide rails having first and second therein apertures;

a head assembly including a jaw assembly for engaging a trailer and means for mounting said head assembly on said pair of spaced guide rails so as to be selectively displaceable between a towing position and a maneuvering position; and a lock on said head assembly including a first bar latch, a second bar latch, a biasing element and a live cam engaging said biasing element, said first bar latch being received in said first aperture in said one guide rail to releaseably lock said head assembly in said towing position and said second bar latch being received in said second aperture in said one guide rail to releaseably lock said head assembly in said maneuvering position.

4. The adjustable fifth wheel hitch of claim 3, wherein said biasing element is a leaf spring.

5. The adjustable fifth wheel hitch of claim 4, wherein said live cam is a roller engaging and rolling over a surface of said leaf spring.

6. The adjustable fifth wheel hitch of claim 3, wherein said live cam is a roller engaging and wiling over a surface of said biasing element.

7. The adjustable fifth wheel hitch of claim 3, wherein said first and second cooperating apertures are offset from one another with respect to a longitudinal axis of said one guide rail and said first and second bar latches are similarly offset.

8. The adjustable fifth wheel hitch of claim 3, wherein said first and second bar latches are both substantially L-shaped.

9. An adjustable fifth wheel hitch, comprising:

a support frame including a pair of spaced guide rails, at least one guide rail of said pair of spaced guide rails having first and second apertures therein;

a head assembly including a jaw assembly for engaging a trailer and shoes/rollers mounting said head assembly on said pair of spaced guide rails so as to be selectively displaceable between a towing position and a maneuvering position; and a lock on said head assembly including a first bar latch, a second bar latch, a biasing element and a live cam engaging said biasing element, said first bar latch being received in said fist aperture in said one guide rail to releaseably lock said head assembly in said towing position and said second bar latch being received in said second aperture in said one guide rail to releaseably lock said head assembly in said maneuvering position.

10. The adjustable fifth wheel hitch of claim 9, wherein said biasing element is a leaf spring.

11. The adjustable fifth wheel hitch of claim 10, wherein said live cam is a roller engaging and rolling over a surface of said leaf spring.

12. The adjustable fifth wheel hitch of claim 9, wherein said live cam is a roller engaging and rolling over a surface of said biasing element.

13. The adjustable fifth wheel hitch of claim 9, wherein said first and second cooperating apertures are offset from one another with respect to a longitudinal axis of said one guide rail and said first and second bar latches are similarly offset.

14. The adjustable fifth wheel hitch of claim 9, wherein said first and second bar latches are both substantially L-shaped.

* * * * *